United States Patent
Hosotani

(10) Patent No.: US 11,907,785 B2
(45) Date of Patent: Feb. 20, 2024

(54) ELECTRONIC CARD WITH ELECTRONIC FUNCTION CIRCUIT

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 18/061,265

(22) Filed: Dec. 2, 2022

(65) Prior Publication Data
US 2023/0100463 A1 Mar. 30, 2023

Related U.S. Application Data

(63) Continuation of application No. PCT/JP2021/004028, filed on Feb. 4, 2021.

(30) Foreign Application Priority Data

Jun. 5, 2020 (JP) .................. 2020-098118

(51) Int. Cl.
*G06K 19/073* (2006.01)
*H02J 50/12* (2016.01)
*H02J 7/00* (2006.01)

(52) U.S. Cl.
CPC ...... *G06K 19/07354* (2013.01); *H02J 7/0068* (2013.01); *H02J 50/12* (2016.02)

(58) Field of Classification Search
CPC ... G06K 19/07354; H02J 50/12; H02J 7/0068
USPC ......................................... 235/451
See application file for complete search history.

(56) References Cited

U.S. PATENT DOCUMENTS

| 10,339,520 B2 * | 7/2019 | Wyatt | G06Q 20/341 |
| 11,755,873 B1 * | 9/2023 | Finn | G06K 19/07749 |
| | | | 235/492 |
| 11,785,323 B1 * | 10/2023 | Kwak | H04N 23/55 |
| | | | 348/374 |

(Continued)

FOREIGN PATENT DOCUMENTS

| JP | H05-266269 A | 10/1993 |
| JP | 2000-194808 A | 7/2000 |

(Continued)

OTHER PUBLICATIONS

International Search Report issued in PCT/JP2021/004028; dated May 11, 2021.

*Primary Examiner* — Allyson N Trail
(74) *Attorney, Agent, or Firm* — Studebaker & Brackett PC

(57) ABSTRACT

An electronic card with electronic function circuit includes a communication antenna for short-range wireless communication, a wireless communication IC electrically coupled to the communication antenna, a receiving coil, a resonant capacitor forming a receiving resonant circuit together with the receiving coil, a rectifying and smoothing circuit coupled to the receiving resonant circuit, receiving display elements, a power control unit that controls power from the receiving resonant circuit, and an electronic function circuit that operates by using the power from the receiving resonant circuit. In response to the receiving coil receiving the power, the power control circuit indicates a power receiving state to a user by driving the receiving display elements.

20 Claims, 7 Drawing Sheets

(56) References Cited

U.S. PATENT DOCUMENTS

| | | | | |
|---|---|---|---|---|
| 2017/0300799 A1* | 10/2017 | Breed | ............... | G06K 19/0718 |
| 2019/0379638 A1* | 12/2019 | Arnberg | .............. | H04L 63/0209 |
| 2023/0054740 A1* | 2/2023 | Li | ......................... | G06F 16/632 |
| 2023/0268774 A1* | 8/2023 | Kaiwa | .............. | H02M 3/33571 |
| | | | | 307/104 |
| 2023/0268776 A1* | 8/2023 | Nagai | ................. | H04B 5/0037 |
| | | | | 320/108 |
| 2023/0318173 A1* | 10/2023 | Oh | ........................ | H01Q 1/526 |
| | | | | 343/841 |

FOREIGN PATENT DOCUMENTS

| | | |
|---|---|---|
| JP | 2012-238126 A | 12/2012 |
| WO | 2017/145879 A1 | 8/2017 |

* cited by examiner

ELECTRONIC CARD WITH ELECTRONIC FUNCTION CIRCUIT

CROSS-REFERENCE TO RELATED APPLICATIONS

This application claims benefit of priority to International Patent Application No. PCT/JP2021/004028, filed Feb. 4, 2021, and to Japanese Patent Application No. 2020-098118, filed Jun. 5, 2020, the entire contents of each are incorporated herein by reference.

BACKGROUND

Technical Field

The present disclosure relates to an electronic card with electronic function circuit including an electronic function circuit such as a biometric authentication circuit.

Background Art

An electronic card having an electronic function circuit such as a biometric authentication circuit is required to wirelessly receive power by wirelessly communicating with a card reader in such a manner as to be held out over the card reader.

In an example of the IC card with electronic function circuit, Japanese Unexamined Patent Application Publication No. 2012-238126 describes an IC card with fingerprint authentication that wirelessly receives power from a magnetic field generated by a reader and thereby performs transmission and reception to and from the reader. The IC card with fingerprint authentication includes an antenna coil, external terminals, a microprocessor for an IC card control process, an indicator, and a processor for controlling a fingerprint authentication process.

SUMMARY

In the IC card with fingerprint authentication described in Japanese Unexamined Patent Application Publication No. 2012-238126, the indicator indicates a state of the IC card. Specifically, it is conceivable that since the indicator is coupled to the processor for the fingerprint process, the indicator lights up or goes off depending on the success or failure of the fingerprint authentication.

In an electronic card with electronic function circuit that operates by using power wirelessly received from a reader placed under the electronic card, the given electronic function thereof is implemented only after the power is received from the reader, and thus received power shortage prevents appropriate operation on occasions depending on the power receiving state. A user of the electronic card with electronic function circuit does not know whether or not power is appropriately received or, for example, whether or not the fingerprint authentication in the electronic function circuit succeeds. The user feels much stress because it takes time to operate the electronic card.

Accordingly, the present disclosure provides an electronic card with electronic function circuit that stabilizes the state of wireless power receiving from a communication apparatus or the like by letting a user know the power receiving state, that thus enables the user to easily stabilize the power receiving state, and that enables the electronic function circuit for biometric authentication or the like to operate promptly, stably, and appropriately.

An electronic card with electronic function circuit that is an example of the present disclosure includes a communication antenna for short-range wireless communication; a wireless communication IC electrically coupled to the communication antenna; a receiving coil; a resonant capacitor forming a receiving resonant circuit together with the receiving coil; a rectifying and smoothing circuit coupled to the receiving resonant circuit; a receiving display element; a power control circuit that controls power from the receiving resonant circuit; and an electronic function circuit that operates by using the power from the receiving resonant circuit. The wireless communication IC performs short-range wireless communication. The receiving coil receives power from a magnetic field at a frequency for the short-range wireless communication. The electronic function circuit operates by using the power received from the receiving resonant circuit. The communication antenna and the receiving coil share electromagnetic field energy that resonates at the frequency for the short-range wireless communication. In response to the receiving coil receiving the power from the resonating electromagnetic field energy, the power control circuit indicates a power receiving state to a user by driving the receiving display element.

According to the configuration above, in response to the receiving coil receiving the power, the indicator of the receiving display element enables the user to comprehend the power receiving state.

According to the present disclosure, the user can easily comprehend the state of the wireless power receiving from a communication apparatus or the like, is prompted to place the electronic card to obtain sufficient power, and can easily stabilize the power receiving state, and the electronic function circuit can operate promptly, stably, and appropriately.

DETAILED DESCRIPTION

Figure 1A:
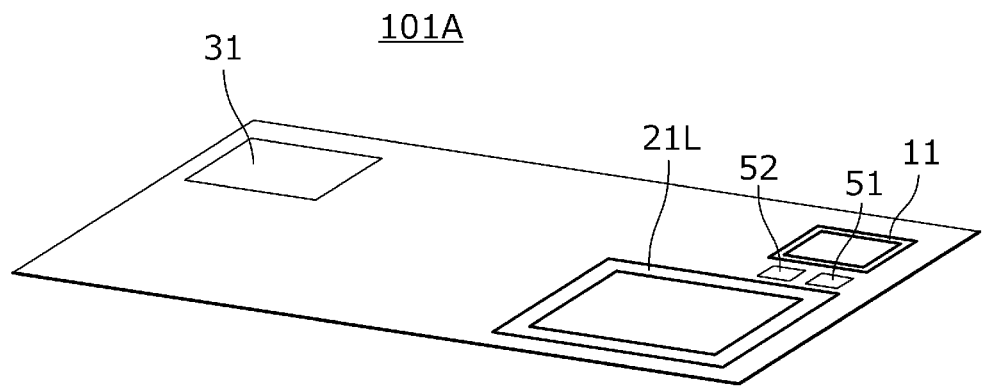
FIG. 1A and FIG. 1B are each a view illustrating the configuration and example arrangement of main components of an electronic card with electronic function circuit according to a first embodiment.

Hereinafter, a plurality of modes for implementing the present disclosure will be described with specific examples with reference to the drawings. The same parts in the drawings are denoted by the same reference numerals. For convenience of explanation, an embodiment is divided into a plurality of embodiments in consideration of the explanation of the gist and easy understanding; however, each of configurations of respective different embodiments may be partially replaced or combined with a different one of the configurations. In and after a second embodiment, description of matters common to those in a first embodiment is omitted, and only different points are described. In particular, the same operations and effects of the same configuration are not referred to one by one for each embodiment.

First Embodiment

Figure 1B:
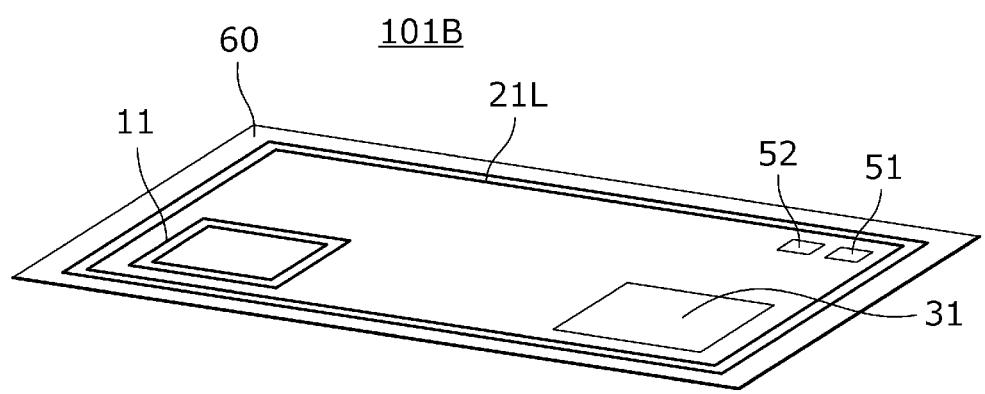

FIG. 1A and FIG. 1B are each a view illustrating the configuration and example arrangement of main components of an electronic card with electronic function circuit according to the first embodiment. An electronic card with electronic function circuit 101A illustrated in FIG. 1A and an electronic card with electronic function circuit 101B illustrated in FIG. 1B each include a communication antenna 11, a receiving coil 21L, a fingerprint sensor 31, and receiving display elements 51 and 52.

The communication antenna 11 is magnetically coupled with, for example, the communication antenna of a near field communication (NFC) reader-writer. The receiving coil 21L is magnetically coupled with the transmitting coil of a power transmission apparatus and the communication antenna of the reader-writer. The communication antenna 11 and the receiving coil 21L are located on the same plane.

The fingerprint sensor 31 detects a fingerprint of a user holding the electronic card with electronic function circuit 101A or 101B. The receiving display elements 51 and 52 are located to be recognizable at a position not hidden by a finger or the back of a hand of the user even in a state where the finger is in contact with the fingerprint sensor 31.

In the electronic card with electronic function circuit 101A, the communication antenna 11 and the receiving coil 21L are disposed to have respective independent coil apertures. In the electronic card with electronic function circuit 101B, the communication antenna 11 and the fingerprint sensor 31 are located inside the coil aperture of the receiving coil 21L. In addition, a magnetic sheet 60 overlapping the entire receiving coil 21L is disposed. That is, the electronic card with electronic function circuit 101B has the shared magnetic sheet 60 forming part of the magnetic path of the communication antenna 11 and the receiving coil 21L. The configuration helps to appropriately define the coefficient of coupling between the communication antenna 11 and the receiving coil 21L. An appropriate coupling coefficient of the magnetic coupling between the communication antenna 11 and the receiving coil 21L is defined based on the arrangement and the structure of the communication antenna 11 and the receiving coil 21L and is preferably set within a range from 0.001 to 0.3. As described above, appropriate coupling between the communication antenna 11 and the receiving coil 21L enables not only the receiving coil 21L but also the communication antenna 11 to be used for power receiving and enables not only the communication antenna 11 but also the receiving coil 21L to be used for communication.

In the electronic cards with electronic function circuit 101A and 101B described above, the communication antenna 11 and the receiving coil 21L are magnetically coupled with each other, and the electronic cards with electronic function circuit 101A and 101B both operate in an NFC frequency band.

Figure 2:
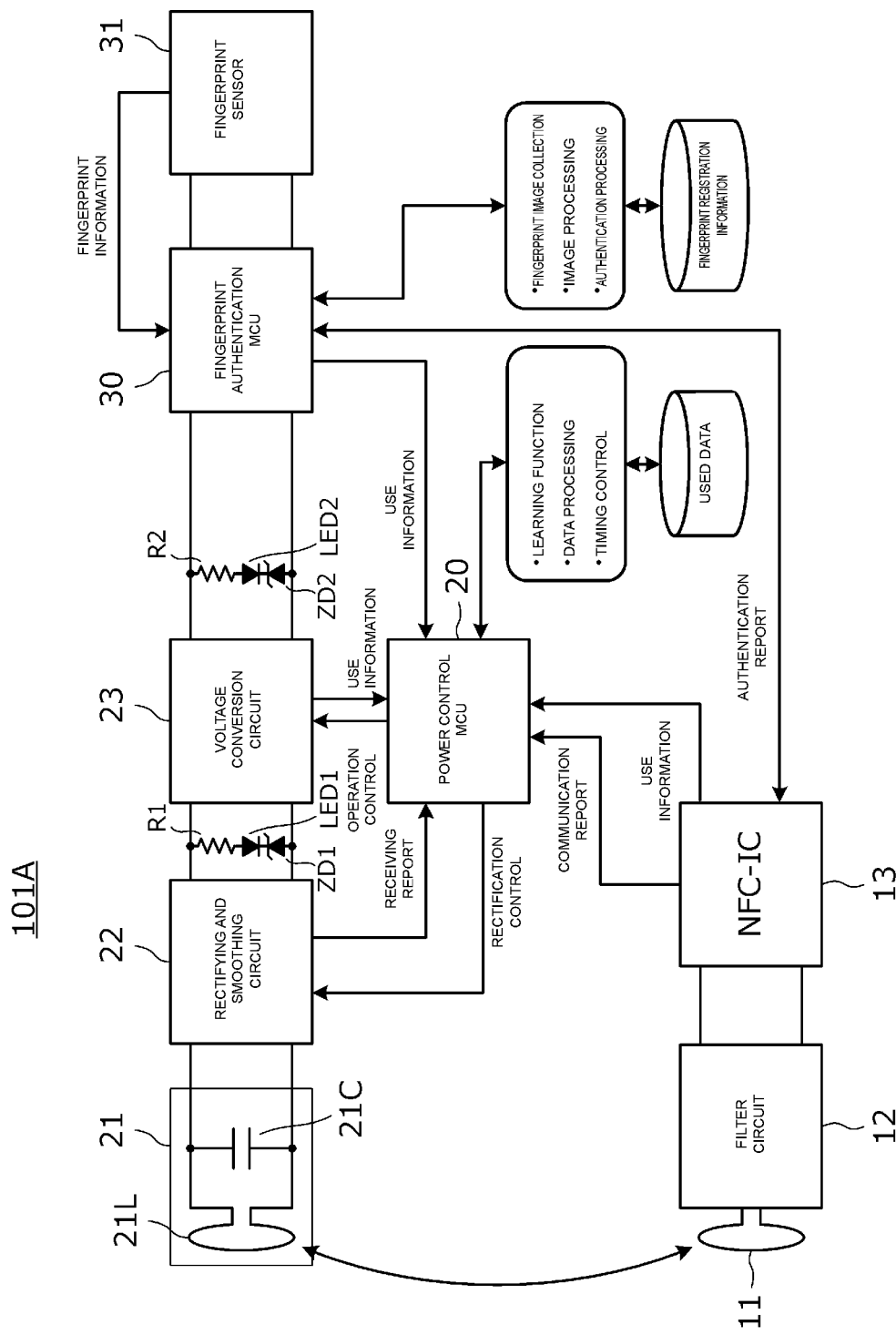
FIG. 2 is a block diagram illustrating the circuit configuration of an electronic card with electronic function circuit according to the first embodiment.

FIG. 2 is a block diagram illustrating the circuit configuration of the electronic card with electronic function circuit 101A according to the first embodiment. The electronic card with electronic function circuit 101B also has the circuit configuration illustrated in FIG. 2.

The electronic card with electronic function circuit 101A includes the communication antenna 11 for NFC, a NFC-IC 13 electrically coupled with the communication antenna 11, the receiving coil 21L magnetically coupled with the communication antenna 11, a resonant capacitor 21C forming a receiving resonant circuit 21 together with the receiving coil 21L, a rectifying and smoothing circuit 22 coupled to the receiving resonant circuit 21, and the fingerprint sensor 31 and a fingerprint authentication MCU 30 that operate by using power from the receiving coil 21L. The electronic card with electronic function circuit 101A further includes a power control MCU 20. The NFC described above corresponds to "short-range wireless communication" according to the present disclosure. In addition, the NFC-IC 13 described above corresponds to a "wireless communication IC" according to the present disclosure.

The electronic card with electronic function circuit 101A is used in such a manner as to be held out over the NFC reader-writer or a direct-current resonant power-transmission apparatus. The frequency band for NFC is a frequency band that is an industrial science and medical band (ISM band) such as a 6.78 MHz band or a 13.56 MHz band, or a frequency band that is a 2.4 GHz band, a 5.7 GHz band, or a 920 MHz band.

The communication antenna 11 and the receiving coil 21L respond in the same frequency band for the NFC. The NFC-IC 13 performs NFC communication. The receiving coil 21L receives power of a signal for the NFC communication. After the NFC-IC 13 is activated, the fingerprint authentication MCU 30 causes the fingerprint sensor 31 to operate by using the power received by the receiving coil 21L. The communication antenna 11 and the receiving coil 21L share electromagnetic field energy that resonates in the NFC communication frequency band by using the magnetic coupling between the communication antenna 11 and the receiving coil 21L.

A filter circuit 12 is disposed between the communication antenna 11 and the NFC-IC 13. The filter circuit 12 is a circuit for increasing input impedance observed from the communication antenna 11 to reduce magnetic noise in communication. If the input impedance observed from the communication antenna 11 is high, the electromagnetic field energy obtained by the communication antenna 11 is largely attenuated, and thus the electromagnetic field energy obtained by the communication antenna 11 is difficult to use as power. In contrast, the receiving coil 21L is electrically coupled with the resonant capacitor 21C and included in the receiving resonant circuit 21, and input impedance observed from the receiving coil 21L is designed to be low and thus is low. Accordingly, the electromagnetic field energy obtained by the receiving coil 21L is attenuated slightly, and the electromagnetic field energy obtained by the receiving coil 21L can be used as power.

The power control MCU 20 receives, from the rectifying and smoothing circuit 22, a power receiving report signal indicating whether power is received and controls rectification of the rectifying and smoothing circuit 22. The power control MCU 20 also supplies a voltage conversion circuit 23 with an operation control signal and receives, from the voltage conversion circuit 23, use information indicating the state of the voltage conversion circuit 23. The power control MCU 20 also receives a communication report signal from the NFC-IC 13. Further, the power control MCU 20 receives, from the NFC-IC 13, use information indicating the state of the NFC-IC 13. The power control MCU 20 also receives, from the fingerprint authentication MCU 30, use information indicating the state of the fingerprint authentication MCU 30.

As illustrated in FIG. 2, the power control MCU 20 performs processing for a learning function related to power control, data processing, timing control processing, and the like and includes a memory unit for data used for the processing.

The power control MCU 20 has the learning function for the power receiving performed by the receiving coil 21L, and the NFC-IC 13 controls operation timing for fingerprint authentication. For example, the NFC-IC 13 records time taken from the start of power receiving performed by holding out the electronic card with electronic function circuit 101A over the reader-writer or from output of a specified voltage from the voltage conversion circuit 23 until actual completion of the fingerprint authentication, and statistically learns an appropriate time until an inquiry to the fingerprint authentication MCU 30 (authentication result reading). The NFC-IC 13 thereby inquires the fingerprint authentication MCU 30 at the timing immediately after the result of the fingerprint authentication. Repeating an unnecessary inquiry to the fingerprint authentication MCU 30 is avoided, and unnecessary power consumption is also avoided.

The fingerprint authentication MCU 30 and the NFC-IC 13 perform reporting regarding the authentication. As illustrated in FIG. 2, the fingerprint authentication MCU 30 performs fingerprint image collection, image processing, authentication processing, and the like and includes a memory unit for fingerprint registration information used for the authentication processing.

An output part of the rectifying and smoothing circuit 22 is provided with a power receiving display circuit composed of a resistor R1, a LED 1, and a Zener diode ZD1. An output part of the voltage conversion circuit 23 is provided with a power receiving display circuit composed of a resistor R2, a LED 2, and a Zener diode ZD2. The LED 1 and the LED 2 each correspond to a "receiving display element" according to the present disclosure.

When the electronic card with electronic function circuit 101A is brought into proximity to the reader-writer, the receiving resonant circuit 21 receives power from the reader-writer, and thus the output voltage of the rectifying and smoothing circuit 22 is increased. When the voltage exceeds a voltage (the Zener voltage of the Zener diode ZD1—the forward drop voltage of the LED 1), the LED 1 lights up. In other words, the receiving display element 51 lights up. A condition for outputting the voltage causing the LED 1 to light up from the rectifying and smoothing circuit 22 is a condition for considering that power receiving is achieved even if the voltage does not reach a voltage required for operation of the fingerprint authentication MCU 30 and the fingerprint sensor 31.

When the electronic card with electronic function circuit 101A is correctly held out over the reader-writer at an appropriate position, the output voltage of the voltage conversion circuit 23 reaches a specified value. When the output voltage of the voltage conversion circuit 23 exceeds a voltage (the Zener voltage of the Zener diode ZD2—the forward drop voltage of the LED 2), the LED 2 lights up. In other words, the receiving display element 52 lights up. A condition for outputting the voltage causing the LED 2 to light up from the voltage conversion circuit 23 is a condition for a voltage reaching a voltage enabling the fingerprint authentication MCU 30 to operate.

As described above, the receiving display elements 51 and 52 indicate the strength of the power received by the receiving coil 21L. Accordingly, the user can verify that the electronic card with electronic function circuit 101A is in a power receiving state by recognizing that the receiving display element 51 (LED 1) of the electronic card with electronic function circuit 101A lights up when the electronic card with electronic function circuit 101A is brought into proximity to the reader-writer, and the user can finely adjust a placement position of the electronic card with electronic function circuit 101A to cause the receiving display element 52 (LED 2) to subsequently light up.

Figure 3:
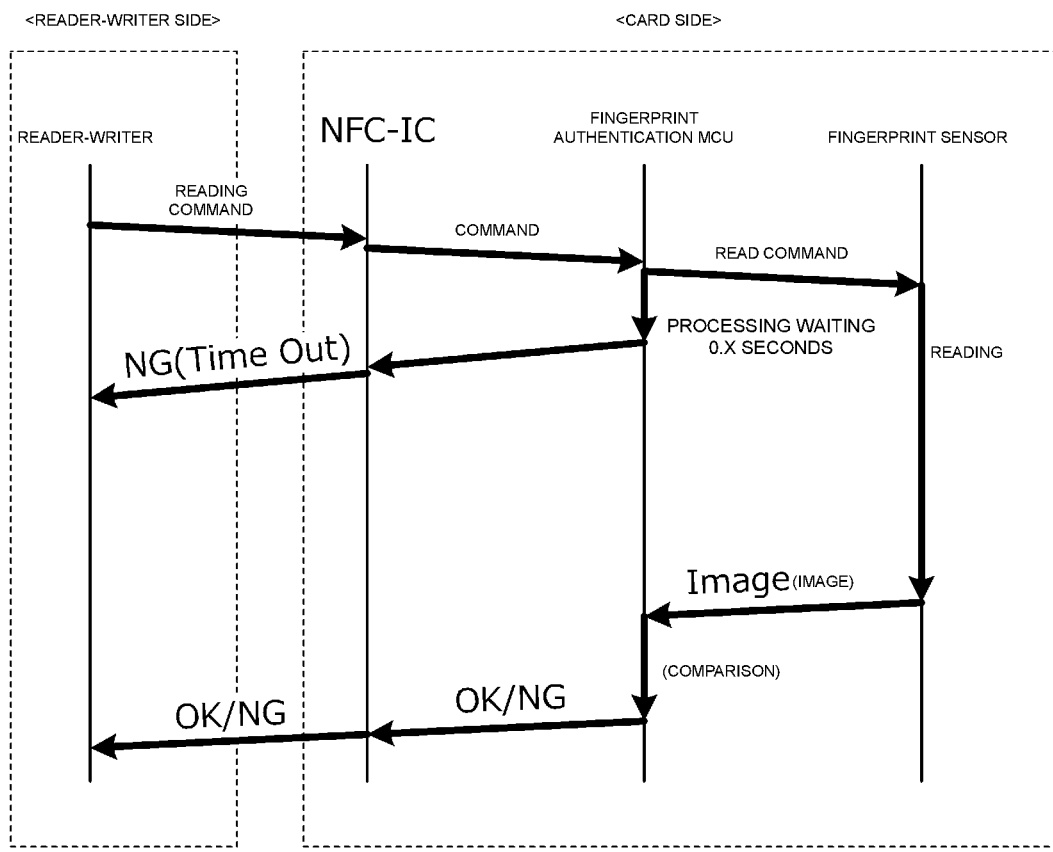
FIG. 3 is a view illustrating the operation sequence of the electronic card with electronic function circuit and an electronic card with electronic function circuit.

FIG. 3 is a view illustrating the operation sequence of each of the electronic cards with electronic function circuit 101A and 101B described above.

First, the reader-writer issues a reading command. The NFC-IC 13 of the electronic card with electronic function circuit receives the reading command and issues a command for fingerprint authentication to the fingerprint authentication MCU 30. The fingerprint authentication MCU 30 thus issues a READ command to the fingerprint sensor 31 and receives image information regarding a fingerprint from the fingerprint sensor 31. The fingerprint authentication MCU 30 checks whether the fingerprint information represents a fingerprint of the user themselves and returns a result indicating OK or NG to the NFC-IC 13. The NFC-IC 13 returns the authentication result to the reader-writer.

If the receiving of sufficient power required to operate the fingerprint sensor 31 has failed, the fingerprint authentication MCU 30 returns NG (time out) to the NFC-IC 13. The NFC-IC 13 thus returns NG (time out) to the reader-writer.

If the receiving of sufficient power required to operate the fingerprint sensor 31 has failed, the fingerprint authentication fails. However, actually, since the user promptly holds out the electronic card with electronic function circuit 101A or 101B over the reader-writer at the appropriate position for an appropriate time to light not only the receiving display element 51 but also the receiving display element 52, there is a considerably low possibility of NG described above, and time taken for retry is also avoided.

Second Embodiment

In the second embodiment, an electronic card with electronic function circuit including an electric storage device is exemplified.

Figure 4:
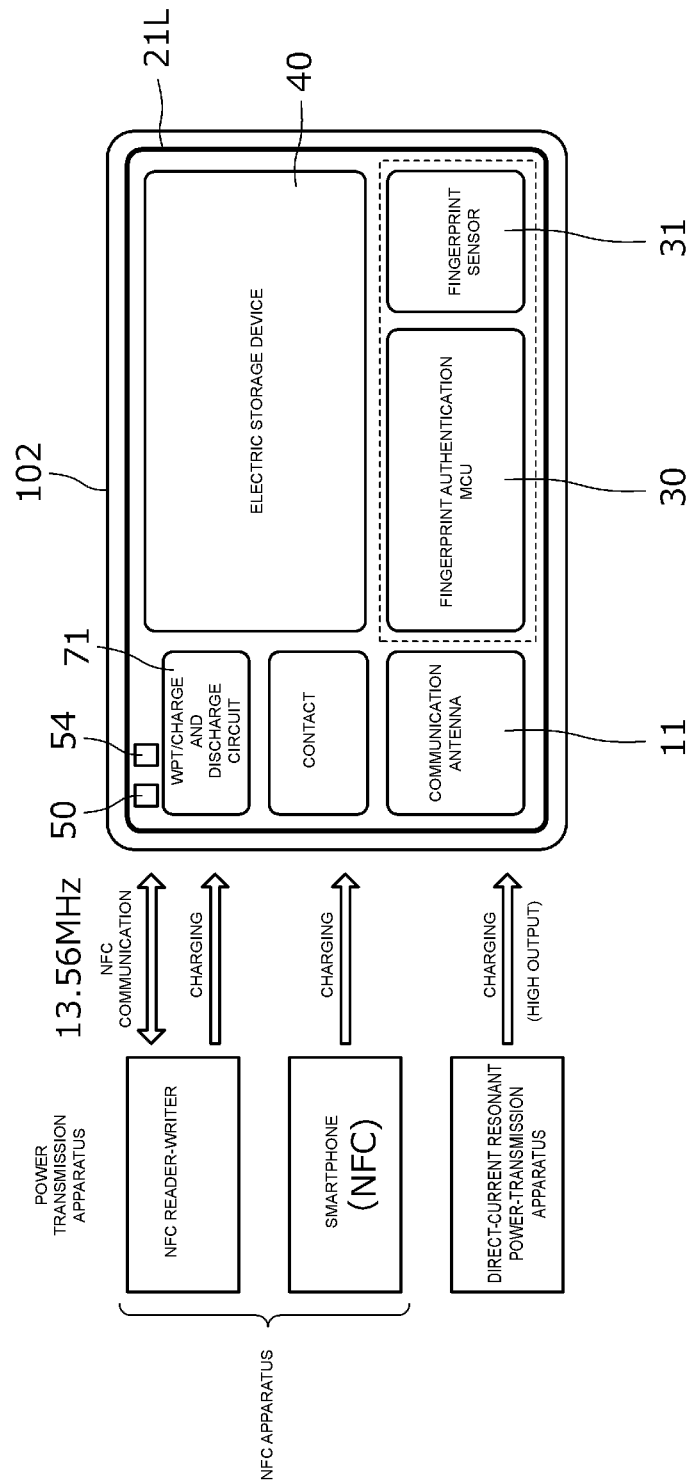
FIG. 4 is a view illustrating the configuration of an electronic card with electronic function circuit according to a second embodiment and a power transmission apparatus.

FIG. 4 is a view illustrating the configuration of an electronic card with electronic function circuit 102 according to the second embodiment and a power transmission apparatus. The electronic card with electronic function circuit 102 includes the communication antenna 11, the receiving coil 21L, the fingerprint authentication MCU 30, the fingerprint sensor 31, a wireless power transfer (WPT)/charge and discharge circuit 71, a receiving display element 50, and a charging display element 54. The "contact" in the figure is a metal terminal connector. The electronic card with electronic function circuit 102 is a contactless card (a card to be held out over the reader-writer, the power transmission apparatus, or the like) but is capable of contact communication through this contact.

The power transmission apparatus includes a NFC reader-writer, a smartphone having a NFC function, a direct-current resonant power-transmission apparatus, and the like. The receiving coil 21L is magnetically coupled with the antenna of any of these communication apparatuses or the coil of the power transmission apparatus and thereby receives power.

Figure 5:
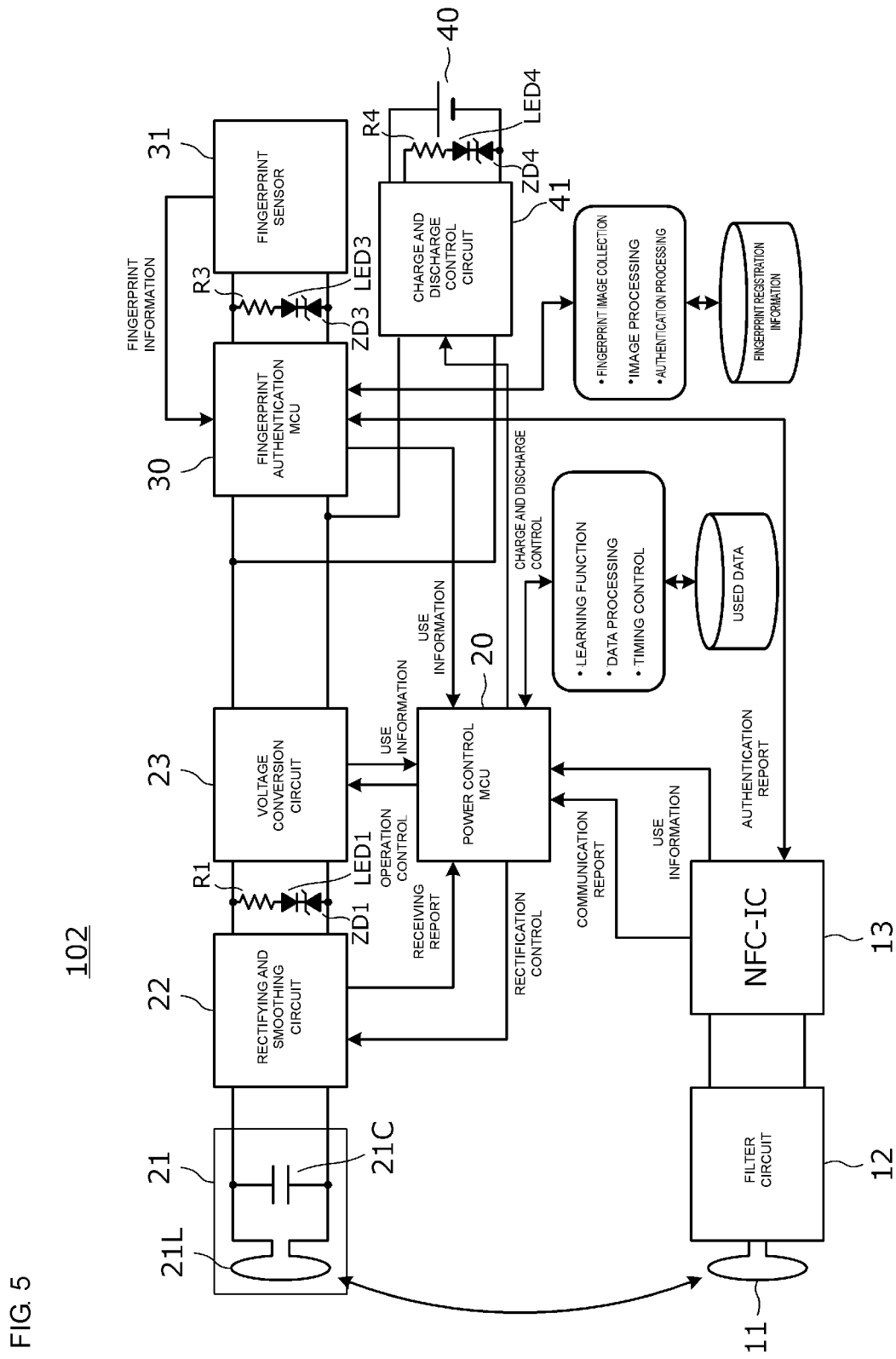
FIG. 5 is a block diagram illustrating the circuit configuration of the electronic card with electronic function circuit according to the second embodiment.

FIG. 5 is a block diagram illustrating the circuit configuration of the electronic card with electronic function circuit 102 according to the second embodiment. The electronic card with electronic function circuit 102 includes an electric storage device 40 and a charge and discharge control circuit 41. The charge and discharge control circuit 41 receives the output voltage of the voltage conversion circuit 23 and controls the charging and discharging of the electric storage device 40. The power control MCU 20 supplies the charge and discharge control circuit 41 with a control signal for the charging and discharging. The resonant capacitor 21C, the rectifying and smoothing circuit 22, the voltage conversion circuit 23, and the charge and discharge control circuit 41 that are illustrated in FIG. 5 form the WPT/charge and discharge circuit 71 illustrated in FIG. 4. The fingerprint authentication MCU 30 and the fingerprint sensor 31 operate by using the output voltage of the voltage conversion circuit 23 or a discharge output voltage from the charge and discharge control circuit 41.

After the NFC-IC 13 is activated, the fingerprint authentication MCU 30 causes the fingerprint sensor 31 to operate by using the power received by the receiving coil 21L. Alternatively, after the NFC-IC 13 is activated, the fingerprint authentication MCU 30 causes the fingerprint sensor 31 to operate by using power from the electric storage device 40.

The output part of the rectifying and smoothing circuit 22 is provided with the power receiving display circuit composed of the resistor R1, the LED 1, and the Zener diode ZD1. In addition, a power receiving display circuit composed of a resistor R3, a LED 3, and a Zener diode ZD3 is provided to the output of the fingerprint authentication MCU 30 (the input of the fingerprint sensor 31). The LED 1 and the LED 3 each correspond to the receiving display element 50 illustrated in FIG. 4. The LED 1 is a green LED, and the LED 3 is a blue LED. The receiving display element 50 performs displaying with a mixed color obtained from the colors of the LED 1 and the LED 3. Accordingly, before fingerprint authentication after only the power receiving, the receiving display element 50 performs displaying with green. When the fingerprint authentication MCU 30 thereafter outputs a voltage for operating the fingerprint sensor 31 to the fingerprint sensor 31, the receiving display element 50 performs displaying with cyan that is the mixed color obtained from green and blue.

In response to receiving the power receiving report from the rectifying and smoothing circuit 22, the power control MCU 20 enables the charge and discharge control circuit 41. If the output voltage of the voltage conversion circuit 23 does not reach a voltage required to charge the electric storage device 40, the charge and discharge control circuit 41 supplies the fingerprint authentication MCU 30 with power of the electric storage device 40.

If the power control MCU 20 detects the termination of the operation of the fingerprint authentication MCU 30, the power control MCU 20 outputs the control signal for charging to the charge and discharge control circuit 41. If the output voltage of the voltage conversion circuit 23 exceeds the voltage required to charge the electric storage device 40, the charge and discharge control circuit 41 thereby charges the electric storage device 40. As described above, after the end of the operation of the fingerprint authentication MCU 30, the power control MCU 20 controls the charge and discharge control circuit 41 and thereby stores the power received by the receiving coil 21L in the electric storage device 40.

The charge and discharge control circuit 41 is provided with a charging display circuit composed of a resistor R4, a LED 4, and a Zener diode ZD4. The charge and discharge control circuit 41 lights the LED 4 by outputting a specified voltage to the aforementioned charging display circuit under the condition for charging the electric storage device 40. The LED 4 corresponds to the charging display element 54 illustrated in FIG. 4.

The configuration except the above is the same as that of the electronic card with electronic function circuit 101A illustrated in FIG. 2.

According to this embodiment, the receiving display element 50 indicates the power receiving strength to the user, and thus the user can easily adjust the position where the electronic card with electronic function circuit 102 is held out over the reader-writer. In addition, since the receiving display element 50 indicates, to the user, that the electronic card with electronic function circuit 102 is in a fingerprint authentication stage, stabilization or the like of stationariness and a holding force of the fingertip at time of the fingerprint authentication can be performed easily, and thus the fingerprint authentication can be performed promptly.

According to this embodiment, since the indication of the charging display element 54 after the fingerprint authentication enables the user to comprehend the charging state of the electric storage device 40, and the user can easily comprehend the completion of the fingerprint authentication and can perform a subsequent operation promptly.

According to this embodiment, the electric storage device 40 can be charged by using power received from the NFC reader-writer or the smartphone that are illustrated in FIG. 4. Even if the power received from the NFC reader-writer or the smartphone is low, the biometric authentication can be performed.

Third Embodiment

In a third embodiment, an example circuit configuration of a direct-current resonant power-transmission apparatus and a power receiving part in an electronic card with electronic function circuit is illustrated.

Figure 6:
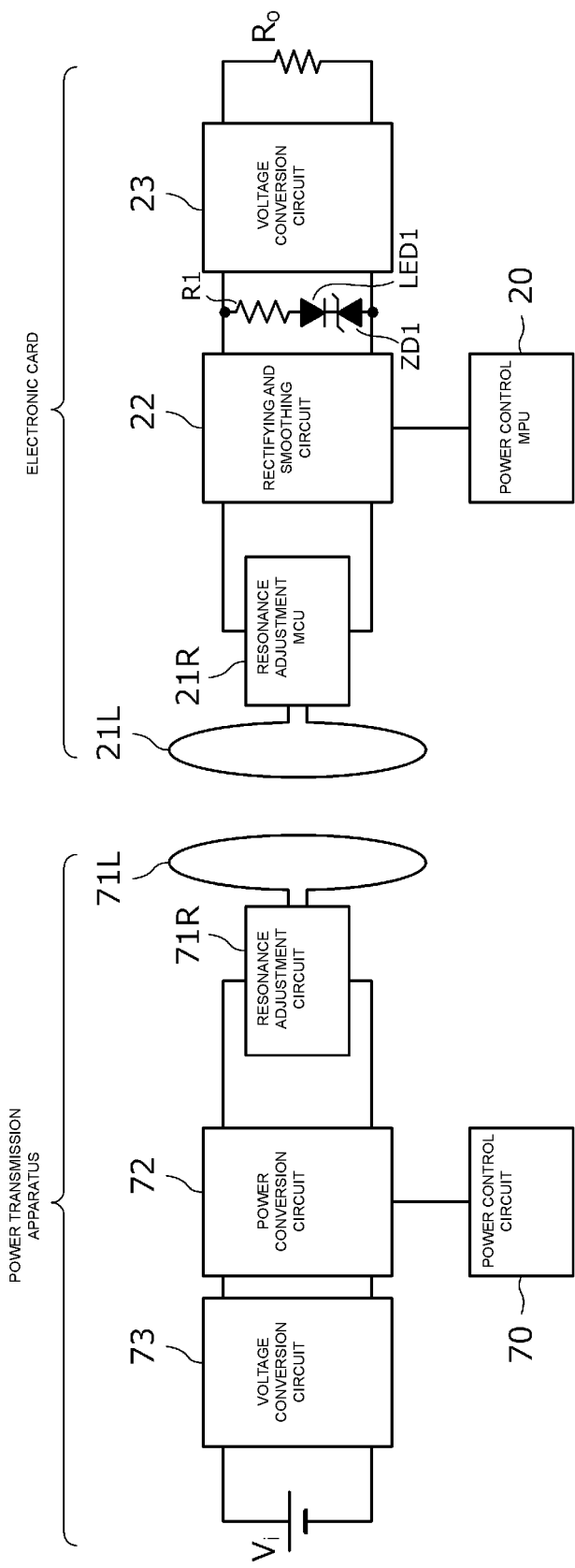
FIG. 6 is a view illustrating a circuit configuration according to a third embodiment of a direct-current resonant power-transmission apparatus and a power receiving part in an electronic card with electronic function circuit.
Figure 7:
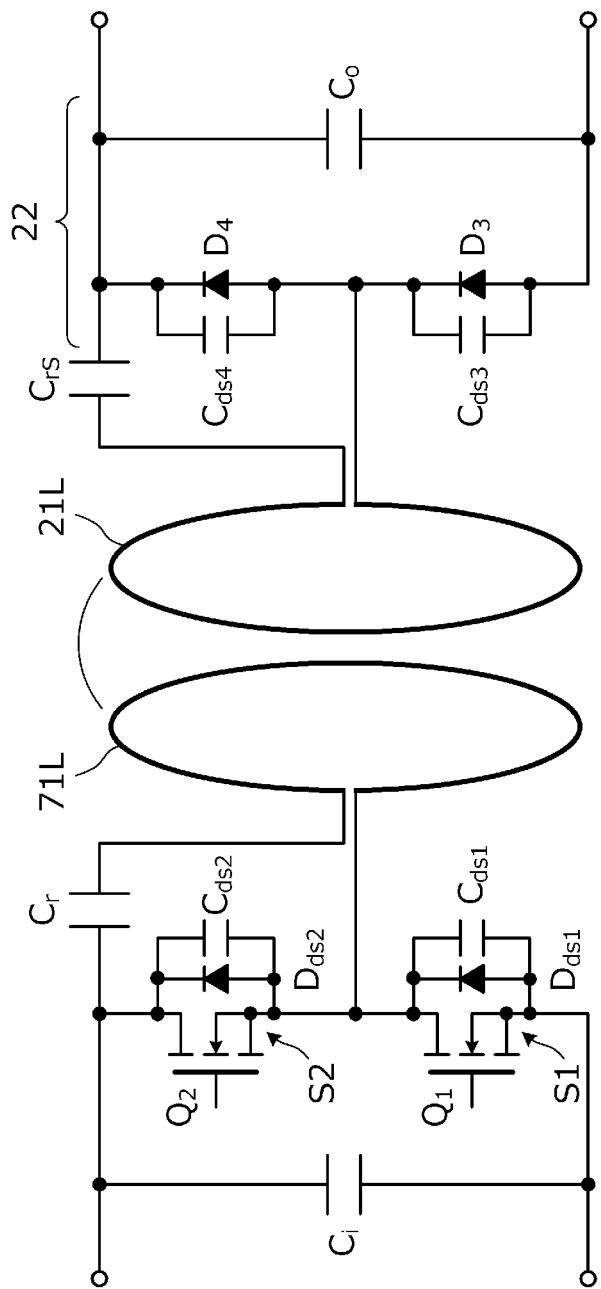
FIG. 7 is a view particularly illustrating the circuit configuration of a power conversion circuit, resonance adjustment circuits, and a rectifying and smoothing circuit that are illustrated in FIG. 6.

FIG. 6 is a view illustrating the circuit configuration according to the third embodiment of a direct-current resonant power-transmission apparatus and a power receiving part in an electronic card with electronic function circuit. FIG. 7 is a view particularly illustrating the circuit configuration of a power conversion circuit 72, resonance adjustment circuits 71R and 21R, and the rectifying and smoothing circuit 22 that are illustrated in FIG. 6.

In FIG. 6, the power transmission apparatus includes a direct-current power supply Vi, a voltage conversion circuit 73 that converts the voltage of the direct-current power supply Vi, the power conversion circuit 72 that supplies alternating current power to a transmitting coil 71L and the resonance adjustment circuit 71R, and a power control circuit 70 for the components.

In FIG. 6, the electronic card with electronic function circuit includes the receiving coil 21L, the resonance adjustment circuit 21R, the rectifying and smoothing circuit 22, the voltage conversion circuit 23, and the power control MCU 20, as has been illustrated in FIG. 4 and the like. A resistor Ro is a load circuit for a fingerprint authentication MCU and the like.

The transmitting coil 71L and the resonance adjustment circuit 71R form a resonant circuit on the power transmitting side, the receiving coil 21L and the resonance adjustment circuit 21R form a resonant circuit on the power receiving side, and the resonant circuits form a resonant field.

In the example illustrated in FIG. 7, a first switch circuit S1, a second switch circuit S2, a switching control circuit, and a resonant capacitor Cr are provided. The first switch circuit S1 equivalently includes a first switching element Q1 and a parallel connection circuit composed of a diode Dds1 and a capacitor Cds1. The second switch circuit S2 equivalently includes a second switching element Q2 and a parallel connection circuit composed of a diode Dds2 and a capacitor Cds2. The switching control circuit is provided outside the figure and controls the switching elements Q1 and Q2. The resonant capacitor Cr is an example of the resonance adjustment circuit 71R illustrated in FIG. 6, and the transmitting coil 71L and the resonant capacitor Cr form a power-transmission resonant circuit.

The first switching element Q1 of the first switch circuit S1 and the second switching element Q2 of the second switch circuit S2 are turned on and off alternately.

The switching control circuit intermittently supplies a direct current voltage to the power-transmission resonant circuit by complementarily switching on the first switching element Q1 and the second switching element Q2 at a predetermined operation frequency and thereby causes the transmitting coil 71L to generate resonance current. This causes a voltage between both ends of each of the first switch circuit S1 and the second switch circuit S2 to have a voltage waveform having a shape of a square wave or a trapezoidal wave. For example, switching operation is performed at 13.56 MHz used in the NFC communication.

A power receiving circuit in the electronic card with electronic function circuit includes the rectifying and smoothing circuit 22 and a receiving resonant circuit composed of the receiving coil 21L and a resonant capacitor Crs. The rectifying and smoothing circuit 22 includes a parallel connection circuit composed of a diode Dds3 and a capacitor Cds3 and a parallel connection circuit composed of a diode Dds4 and a capacitor Cds4.

The diodes Dds3 and Dds4 rectify a voltage generated in the receiving resonant circuit composed of the receiving coil 21L and the resonant capacitor Crs, and a capacitor Co smooths the voltage. In this example, the receiving coil 21L and the resonant capacitor Crs form the receiving resonant circuit. The aforementioned power-transmission resonant circuit and the receiving resonant circuit resonate.

As described above, wireless power supply using the direct current resonance enables the power transmission apparatus to wirelessly transmit high output power and thus enables the electronic card with electronic function circuit to receive high power. It is also possible to charge an electric storage device in a short time.

Lastly, the present disclosure is not limited to the embodiments described above. Modifications and changes may be made appropriately by those skilled in the art. The scope of the present disclosure is defined by the scope of claims, not by the embodiments above. Further, the scope of the present disclosure includes a modification and a change made from the embodiments in the scope equivalent to the scope of claims.

For example, the electronic card with electronic function circuit having the function of authenticating a fingerprint of the user of the electronic card with electronic function circuit has been exemplified in each embodiment above. The embodiment is likewise applicable to a case where biometric authentication is performed by using finger vein authentication, authentication using a camera image, authentication using voice, or the like, besides a fingerprint.

In addition, the embodiment is likewise applicable to, for example, an electronic card with electronic function circuit having an electronic function for acceleration, temperature and humidity, illuminance, sound volume, or the like, besides the biometric authentication.

What is claimed is:

1. An electronic card with electronic function circuit comprising:
    a communication antenna for short-range wireless communication;
    a wireless communication IC electrically coupled to the communication antenna and configured to perform short-range wireless communication;
    a receiving coil configured to receive power from a magnetic field at a frequency for the short-range wireless communication;
    a resonant capacitor configuring a receiving resonant circuit together with the receiving coil;
    a rectifying and smoothing circuit coupled to the receiving resonant circuit;
    a receiving display element;
    a power control circuit configured to control power from the receiving resonant circuit; and
    an electronic function circuit configured to operate by using the power from the receiving resonant circuit, wherein
    the communication antenna and the receiving coil are configured to share electromagnetic field energy that resonates at the frequency for the short-range wireless communication, and
    in response to the receiving coil receiving the power from the resonating electromagnetic field energy, the power control circuit is configured to indicate a power receiving state to a user by driving the receiving display element.

2. The electronic card with electronic function circuit according to claim 1, wherein
    the receiving display element is configured to indicate strength of power receiving performed by the receiving coil.

3. The electronic card with electronic function circuit according to claim 1, wherein
    the power control circuit has a learning function for the power receiving performed by the receiving coil and is configured to control operation timing of the electronic function circuit in cooperation with the wireless communication IC.

4. The electronic card with electronic function circuit according to claim 1, wherein
    the electronic function circuit is configured as a biometric authentication circuit and a biometric sensor.

5. The electronic card with electronic function circuit according to claim 4, wherein
    the biometric authentication circuit is configured as a fingerprint authentication circuit.

6. The electronic card with electronic function circuit according to claim 4, wherein
    the receiving display element is at a position away from the biometric sensor and is configured to allowing the receiving display element to be recognized in operation of the electronic function circuit.

7. The electronic card with electronic function circuit according to claim 1, wherein the communication antenna and the receiving coil are on a same plane.

8. The electronic card with electronic function circuit according to claim 1, wherein
the frequency for the short-range wireless communication is a frequency in an industrial science and medical (ISM) band.

9. The electronic card with electronic function circuit according to claim 1, wherein
the frequency for the short-range wireless communication is a frequency in a 6.78 MHz band or a 13.56 MHz band.

10. The electronic card with electronic function circuit according to claim 1, wherein
the communication antenna is magnetically coupled with the receiving coil.

11. The electronic card with electronic function circuit according to claim 10, wherein
a coupling coefficient of magnetic coupling between the receiving coil and the communication antenna is defined based on arrangement and a structure of the communication antenna and the receiving coil and is set within a range from 0.001 to 0.3.

12. The electronic card with electronic function circuit according to claim 1, wherein
after the wireless communication IC is activated, the power control circuit is configured to cause the electronic function circuit to operate by using the power received by the receiving coil.

13. The electronic card with electronic function circuit according to claim 1, further comprising:
an electric storage device configured to store the power received by the receiving coil.

14. The electronic card with electronic function circuit according to claim 13, wherein
after the wireless communication IC is activated, the power control circuit is configured to cause the electronic function circuit to operate by using the power from the electric storage device.

15. The electronic card with electronic function circuit according to claim 13, wherein
after end of operation of the electronic function circuit, the power control circuit is configured to store the power received by the receiving coil in the electric storage device.

16. The electronic card with electronic function circuit according to claim 13, further comprising:
a charge and discharge control circuit configured to control charging and discharging of the electric storage device; and
a charging display element configured to display a charging state of the electric storage device,
wherein the charge and discharge control circuit is configured to control charging of the electric storage device and drive the charging display element.

17. The electronic card with electronic function circuit according to claim 2, wherein
the power control circuit has a learning function for the power receiving performed by the receiving coil and is configured to control operation timing of the electronic function circuit in cooperation with the wireless communication IC.

18. The electronic card with electronic function circuit according to claim 2, wherein
the electronic function circuit is configured as a biometric authentication circuit and a biometric sensor.

19. The electronic card with electronic function circuit according to claim 5, wherein
the receiving display element is at a position away from the biometric sensor and is configured to allowing the receiving display element to be recognized in operation of the electronic function circuit.

20. The electronic card with electronic function circuit according to claim 2, wherein
the communication antenna and the receiving coil are on a same plane.

* * * * *